No. 714,506. Patented Nov. 25, 1902.
J. MORGAN.
TROLLEY.
Application filed Aug. 28, 1902.
(No Model.)
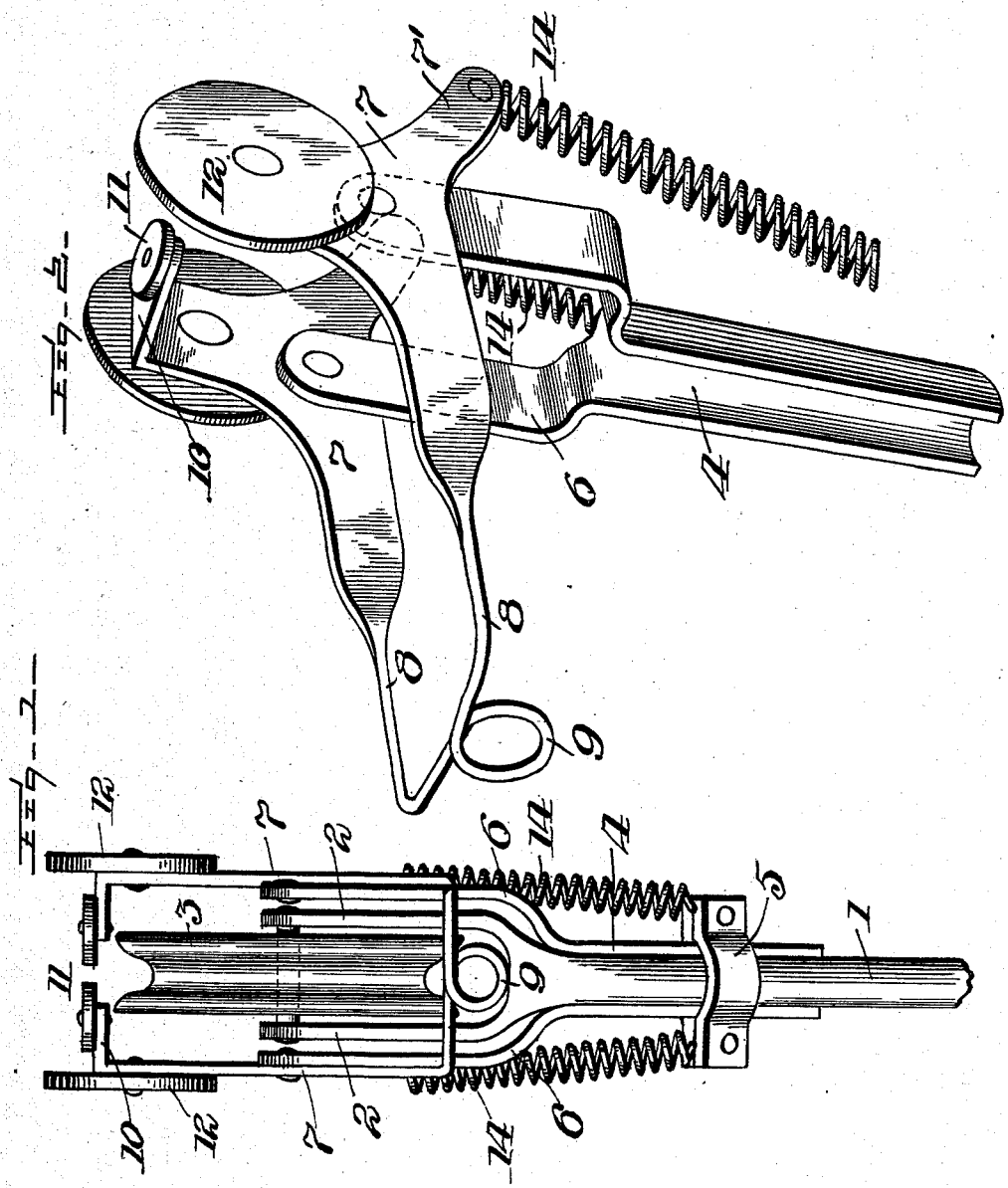

UNITED STATES PATENT OFFICE.

JAMES MORGAN, OF ELLWOOD CITY, PENNSYLVANIA.

TROLLEY.

SPECIFICATION forming part of Letters Patent No. 714,506, dated November 25, 1902.

Application filed August 28, 1902. Serial No. 121,274. (No model.)

*To all whom it may concern:*

Be it known that I, JAMES MORGAN, a citizen of the United States of America, residing at Ellwood City, in the county of Lawrence and State of Pennsylvania, have invented certain new and useful Improvements in Trolleys, of which the following is a specification, reference being had therein to the accompanying drawings.

This invention relates to certain new and useful improvements in trolleys; and it has for its object to provide novel and effective means whereby the trolley-wheel will be maintained in constant engagement with the trolley-wire and the liability of the wheel leaving or "jumping" the wire, as it is ordinarily termed, prevented.

My invention may be more particularly described as an attachment for trolley-wheels, as it may be attached to the ordinary trolley-wheel where the same is unprovided with a guard.

Briefly described, the invention comprises a harp which is adapted to be clamped direct to the trolley-pole and the prongs or arms of which are wide enough apart to span the arms or prongs of the harp carrying the trolley-wheel. Pivotally mounted on the arms or prongs of the supplemental harp is a spring-held guard which carries guard-rollers that lie over the trolley-wheel, and consequently over the trolley-wire, preventing the wheel from leaving the latter. This guard also carries rollers, which project slightly above the guard-rollers, so that the latter when the trolley is passing under bridges, switches in the current or trolley wire, or other obstructions the guard-rollers will not come in contact therewith.

In describing the invention in detail reference will be had to the accompanying drawings, forming a part of this specification, and wherein like numerals of reference will be employed to indicate like parts throughout both views, in which—

Figure 1 is an elevation of a trolley-head equipped with my improvements, the trolley-pole being broken away. Fig. 2 is a detail perspective view of the attachment.

In the accompanying drawings, 1 indicates the trolley-pole, 2 the harp, and 3 the trolley-wheel, all of which may be of the ordinary construction.

My invention comprises the attachment now to be described; and it consists of a shank 4, which may be made semicylindrical, as shown, and engages the trolley-pole, as shown in Fig. 1, and is clamped thereto in suitable manner, the construction shown being a pair of clamp-plates 5, bound together by rivets or bolts near their ends and serving to clamp the attachment securely to the trolley-pole. The shank or half-sleeve 4, together with the arms or prongs 6, which it carries, may be made from a single blank of material, thus affording a cheap construction. Pivotally mounted on the arms or prongs of this harp, which I herein term the "supplemental" harp, is the guard, which embodies two side plates 7, somewhat star-shaped in their form, with one of the arms extended rearwardly and reduced down in size into a rod 8, which is looped to form an eye 9, adapted to receive the rope, (not shown,) that is attached to the trolley-pole. The vertically-extending arm of each of the plates 7 is bent inwardly at its upper end, as at 10, and on these portions 10 are pivotally mounted the guard-rollers 11, which project beyond the ends of the portions 10, and thus lie over the trolley-wire. (Not shown.) Pivotally mounted on the outer face of the upwardly-extending arms of the plates 7 are a pair of rollers or wheels 12, which project above the rollers 11, and thus prevent these latter rollers from engaging with switches or the like when the trolley-wheel is passing underneath the same.

The device is normally held so that its guard-rollers will lie above the trolley-wire by means of springs 14, attached to the arms 7' of the plates 7, with their lower ends attached to the trolley-pole directly or indirectly, the means shown in this illustration being by connecting the lower ends of these springs to the rivets or bolts, which bind the clamps 5 together, thus obviating the necessity for any other fastening for the springs.

In operation when the operator pulls downwardly on the trolley-rope (not shown) the plates forming the guard by reason of the trolley-rope passing through the eye 9 will be swung on their pivots and the rollers 11 caused to pass below the trolley-wire. When the pull on the rope is relieved, the guard will return to its normal position. The space between the rollers 11, while sufficient to permit the passage of the trolley-wire, will not permit the wheel to leave the wire while the car is in travel, as the wire in leaving the wheel rides on the curved faces of the groove in the latter, and is consequently engaged in under either one or the other of the guard-rollers and conducted back into its groove in the wheel.

Having fully described my invention, what I claim as new, and desire to secure by Letters Patent, is—

1. An attachment for trolley-heads, comprising a supplemental harp, guard-plates pivotally mounted thereon, guard-rollers carried by said plates, and rollers pivotally mounted on the outer face of said plates, as and for the purpose described.

2. A trolley attachment comprising a supplemental harp, guard-plates comprising a series of radially-extending arms, one pair of said arms being connected and carrying an eye, guard-rollers carried by another pair of said arms, and springs attached to still another pair of the arms and to the supplemental harp, as and for the purpose described.

3. An attachment for trolley-heads comprising a supplemental harp, guard-plates pivotally mounted thereon, and side arms secured to the said plates, said side arms having their outer ends bent to form an eye.

4. An attachment for trolley-heads, comprising a supplemental harp, and guard-plates pivotally mounted thereon, said guard-plates having their upper ends bent inwardly.

5. An attachment for trolley-heads, comprising a supplemental harp, guide-plates pivotally mounted thereon, said guide-plates having their upper ends bent inwardly, outwardly-extending arms secured to the said guide-plates, and springs interposed between the said arms and harp, substantially as described.

6. An attachment for trolley-heads, comprising a supplemental harp, guard-plates pivotally mounted thereon, said guard-plates having their upper ends bent inwardly, rollers mounted on the sides of the said plates, and guard-rollers mounted in the inwardly-bent ends of the said plates, substantially as and for the purpose specified.

7. The combination with the trolley-pole, the harp thereof, and the trolley-wheel, of a supplemental harp affixed to the said trolley-pole, a guard carried by the said supplemental harp, and a pair of rollers journaled on the sides of the said guard, said rollers extending above the said trolley-wheel, and guard, substantially as and for the purpose specified.

8. An attachment for trolley-heads, comprising a supplemental harp, guard-plates pivotally mounted thereon, said guard-plates having their upper ends bent inwardly, rollers journaled on the sides of the said guard-plates, guard-rollers journaled on the inwardly-bent ends of the said guard-plates, and arms formed integral with the side edges of the said guard-plates, said arms having their outer ends bent to form an eye, substantially as described.

In testimony whereof I affix my signature in the presence of two witnesses.

JAMES MORGAN.

Witnesses:
LOUIS YOUNG,
S. Y. DOUDS.